(12) United States Patent  (10) Patent No.: US 8,571,612 B2
Gold  (45) Date of Patent: Oct. 29, 2013

(54) MOBILE VOICE MANAGEMENT OF DEVICES

(75) Inventor: Duff H. Gold, Apollo, PA (US)

(73) Assignee: Vocollect, Inc., Pittsburgh, PA (US)

( * ) Notice: Subject to any disclaimer, the term of this patent is extended or adjusted under 35 U.S.C. 154(b) by 0 days.

(21) Appl. No.: 13/314,342

(22) Filed: Dec. 8, 2011

(65) Prior Publication Data

US 2013/0150017 A1    Jun. 13, 2013

(51) Int. Cl.
*H04M 1/00*    (2006.01)

(52) U.S. Cl.
USPC ............ 455/575.2; 455/456.1; 455/230; 381/74; 381/377; 381/375; 705/14.4

(58) Field of Classification Search
USPC ........ 455/411, 469.1, 575.2, 419, 456.1, 230; 713/322; 381/74, 377, 375, 370; 340/438, 426.28, 426.22; 705/28, 7.14, 705/7.13, 14.4
See application file for complete search history.

(56) References Cited

U.S. PATENT DOCUMENTS

| | | | | |
|---|---|---|---|---|
| 6,073,062 A | * | 6/2000 | Hoshino et al. | 701/3 |
| 2003/0045946 A1 | * | 3/2003 | Hattori et al. | 700/27 |
| 2007/0184881 A1 | * | 8/2007 | Wahl et al. | 455/575.2 |
| 2009/0234728 A1 | * | 9/2009 | Willuns et al. | 705/14 |
| 2010/0271983 A1 | * | 10/2010 | Bryant | 370/277 |
| 2010/0311337 A1 | * | 12/2010 | Riviere | 455/41.3 |
| 2011/0117923 A1 | * | 5/2011 | Yonezawa et al. | 455/456.1 |
| 2012/0005281 A1 | * | 1/2012 | Winter et al. | 709/206 |

* cited by examiner

*Primary Examiner* — Mahendra Patel
(74) *Attorney, Agent, or Firm* — Wood, Herron & Evans, LLP

(57) ABSTRACT

A method and system for remotely managing mobile devices over a communication network including transceiving user input data generated at a mobile management terminal to a management computer over a communication network. The transceived user input data is analyzed to determine whether the user input data corresponds to a stored command function and the stored command function is executed at the management computer in response to determining that the user input data corresponds to a stored command function. Data is transceived from the management computer to one or more mobile host devices over the communication network.

18 Claims, 8 Drawing Sheets

MOBILE VOICE MANAGEMENT OF DEVICES

FIELD OF THE INVENTION

Embodiments of the invention relate to mobile devices and more particularly to managing mobile devices wirelessly from a mobile management device.

BACKGROUND OF THE INVENTION

Wearable, mobile, and/or portable computer devices are used for a wide variety of tasks. Such devices allow the workers using them ("users") to maintain mobility, while providing the worker with desirable computing and data-processing functions. Furthermore, such devices often provide a communication link to a larger, more centralized management computer and/or computer system that directs the activities of the user and processes any collected data. One example of a specific use for a wearable/mobile/portable device is a product management system that involves product distribution and tracking as well as product inventory management, where these communication systems may sometimes be referred to as mobile warehouse management systems. In conventional systems, the mobile devices typically include an interface with a headset having a microphone and speakers such that users of the devices may receive spoken instructions related to tasks to be completed, and may answer with speech. Such systems are referred to as speech-directed work systems.

In conventional systems, mobile devices used by workers may be loaded with a specific profile associated with the device, the user, and the tasks the worker will be performing, where the loaded profile may change several times per day. In some conventional systems, device profiles may correspond to a specific worker and may include worker speech preferences, such as speed of verbal instructions (i.e. rate of playback), language of verbal instructions, and other configuration settings related to the mobile devices such as functions of buttons, etc. In conventional systems, workers may input data using speech into the mobile device related to the tasks being performed, thus in some mobile device systems, data related to a worker's speech patterns may be stored in a device profile such that the worker's unique speech characteristics may be accounted for when converting the worker's speech input into input data. Different profiles associated with different tasks, job functions, and/or employees may be stored in the management computer, such that the profiles may be loaded onto worker devices by supervisors as different profiles are needed on a mobile device. For example, when a worker finishes a shift, the worker may deposit a mobile device loaded with a profile associated with the tasks the worker performed in a centralized location, and a second worker beginning a shift may retrieve the mobile device and have a profile loaded onto the device associated with the tasks the new worker will be performing, where the profiles are likely to be different. In another example, a worker may complete a set of tasks associated with a first profile, and the worker may need a second profile loaded to complete a second set of different tasks.

In conventional systems utilizing mobile devices, a supervisor may load specific devices with a desired profile utilizing the management computer. In addition, some elements of a profile may be loaded by a worker using the mobile device, including for example, the worker's speech patterns. However, each time a device is loaded with a different profile or a profile is changed, the supervisor must return to the management computer and select the appropriate profile to load on the appropriate mobile device. As one can imagine, this leads to decreased efficiency of the supervisor and the employee using the mobile device, as the manager must end supervising workers and go to the management computer to load the correct profile. In addition, the employee using the mobile device must wait for the supervisor to travel to the management computer and load the appropriate profile. Moreover, in many workplace environments utilizing these mobile device systems, workers may not be permitted to perform any work without supervision for safety reasons.

Accordingly, there is a need, unmet by current communication systems and mobile devices, to address the issues noted above. There is particularly an unmet need in the area of increasing efficiency in managing mobile devices.

SUMMARY OF THE INVENTION

A system and method for efficiently managing mobile devices, in which a mobile management device remotely interfaces with a centralized management computer to allow a supervisor to manage one or more mobile host devices being used by employees. A user interfaces with a mobile management device and the mobile management device transceives user input data from the mobile management device to a management computer over a communication network. A management computer determines whether the user input data corresponds to a stored command function. The stored command function corresponding to the user input data is executed at the management computer in response to determining that the user input data corresponds to the stored command function. Data is selectively transceived from the management computer to one or more mobile host devices over the communication network, such that the mobile host devices may be remotely managed by the mobile management device interfacing with the management computer over the communication network.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Embodiments of the invention are generally directed to a system and method for managing mobile host devices using a mobile management device interfacing with a management computer. For example, a mobile management and/or host device, such as the Talkman® terminal is available from Vocollect, Inc. of Pittsburgh, Pa. For example, in warehouse workplace environments where workers wear mobile devices to receive spoken instructions related to tasks to be performed by the worker, different profiles may be loaded onto the worker device. A supervisor may interface with the warehouse management computer from a mobile management device to load device profiles onto one or more desired worker devices, where a device profile may include, for example, a firmware for a worker device, an operating system for a worker device, an executable application for a worker device, and/or configuration data.

Figure 1:
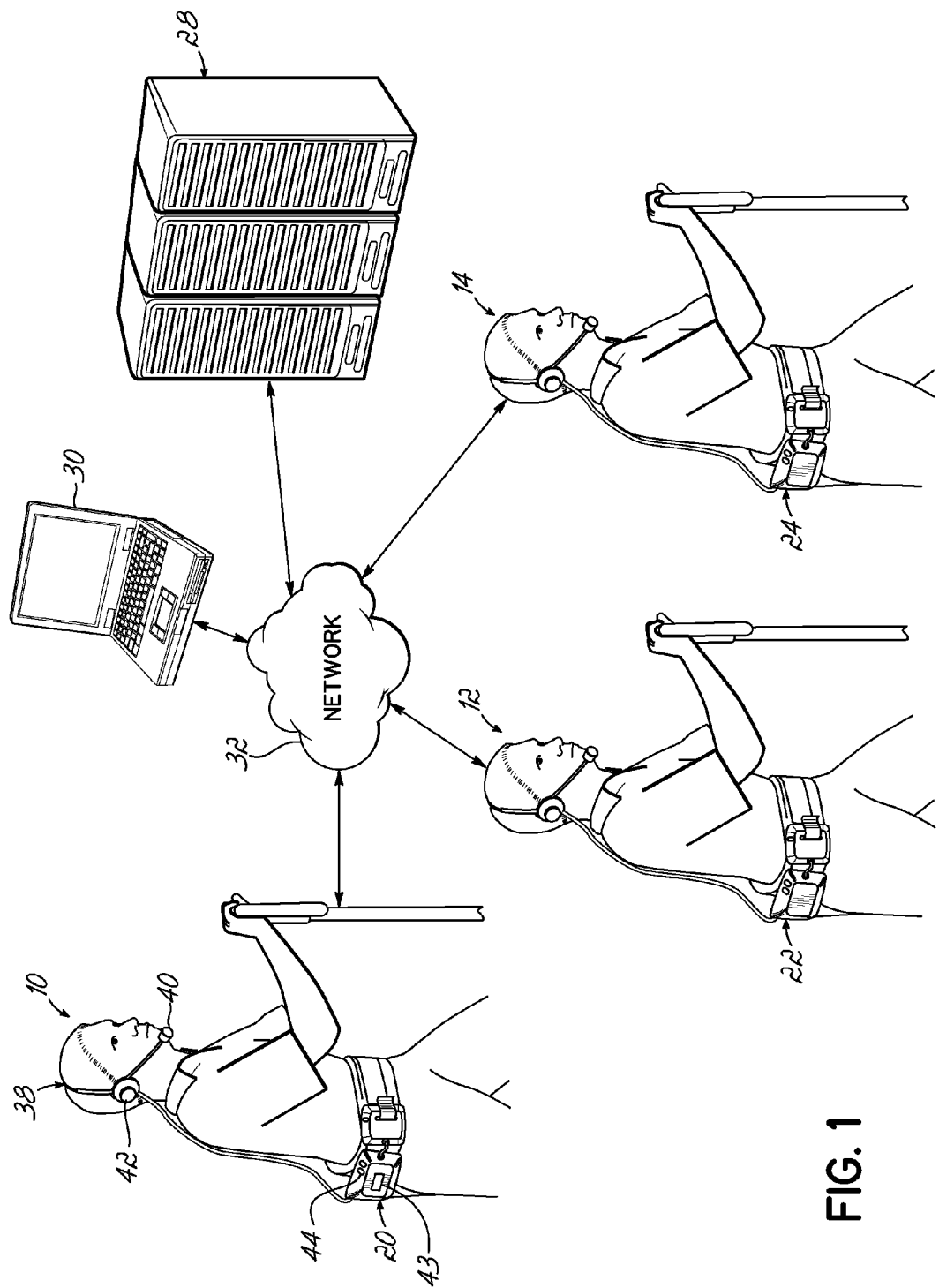
FIG. 1 is a diagrammatic illustration of a system including workers having mobile devices and a management computer in communication with the mobile devices consistent with embodiments of the invention.

Referring now to FIG. 1, which provides an exemplary mobile device workplace environment including a supervisor 10, a first worker 12, and a second worker 14. As shown in FIG. 1, the supervisor and workers each are equipped with mobile devices 20, 22, 24 in communication with a central system computer or server 28, and with management computer 30 over communication network 32.

Generally, in a speech-directed work environment, the various workers carrying or wearing the mobile devices 22, 24 will interface with a central system computer or server 28, which runs a warehouse management system (WMS). Through a series of work applications or tasks downloaded from either the central system 28 or management computer 30 to the devices 22, 24, the workers are provided with a speech dialog. Through the speech dialog, the workers are given spoken instructions to perform certain tasks. The spoken instructions are provided through speaker 42 of the headset 38, i.e., sound based on the instructions is reproduced through speaker 42. Pursuant to the spoken dialog, the workers also provide replies or responses through microphone 40, and that way, work is completed, and data is collected with respect to the completed work. In accordance with one aspect of the invention, a supervisor is able to further supervise and manage the various devices 22, 24 used by the workers without requiring the presence of the supervisor at a desk or other location of the management computer 30. The mobile devices are equipped with speech functionality, including speech recognition applications, to recognize speech of a user and text-to-speech (TTS) applications to convert data to speech. In some embodiments consistent with the invention, supervisor 10 may utilize the mobile device 20 to interface with management computer 30 to load a device profile, other applications, or data onto devices 12 and 14 of workers 22 and 24. Device profiles, applications, and data may be stored in the management computer 30, and may be transmitted over communication network 32 to be loaded onto one or more devices. Moreover, device profiles (e.g., firmware, operating system, application, configuration data) may correspond to a set of tasks to be performed, to a specific worker's voice settings (e.g., speed of voice reproduction, language of voice reproduction), operator data, or to other operational parameters for the device.

As shown in FIG. 1, mobile management device 20 is coupled with a headset 38 that includes microphone 40, speaker 42. Other peripherals, like a display 43, may be used, as noted below. Device 20 also includes buttons 44, such that supervisor 10 may interface with management computer 30 over communication network 32 through voice commands captured using microphone 40 and/or button commands input using buttons 44. Other input interfaces rather than buttons might also be available on the device. Management computer 30 may be configured to run a management interface, such that management computer 30 may execute command functions based at least in part on speech and/or button commands transmitted from mobile management device 20 to management computer 30. In some embodiments, management computer 30 may transmit audio data to mobile management device 20 based at least in part on the received commands from mobile device and/or the command functions executed by management computer 30. The audio data received by mobile management device 20 may be reproduced as speech through headset 38 for carrying on a dialog with the supervisor, such that supervisor may receive audio confirmation of executed command functions, audio requests for more commands based at least in part on previously transmitted commands, and/or audio menu options.

In some embodiments, mobile management device 20 may reproduce audio menu options based on the voice and/or button commands received by the management computer 30, and supervisor 10 may input additional voice and/or button commands to navigate the audio menu options and make a menu selection. The menu options might also be displayed graphically. The menu selection may be input by the supervisor 10 using voice and/or button commands into mobile management device 20, and mobile management device 20 may generate selection data based at least in part on the received audio data and the voice and/or button commands input by the supervisor 10. As such, the supervisor may navigate a menu of options generated by the management computer 30 and/or the mobile management device 20 using mobile management device 20 to direct management computer 30 to execute one or more command functions. Management computer 30 may execute one or more command functions based on the selection data generated by mobile management device 20, such that management computer 30 may transmit a desired device profile, application, or data stored in the management computer 30 to one or more desired mobile devices, such as device 22 and/or device 24. Also, commands may be issued to the mobile management device 20.

Figure 2:
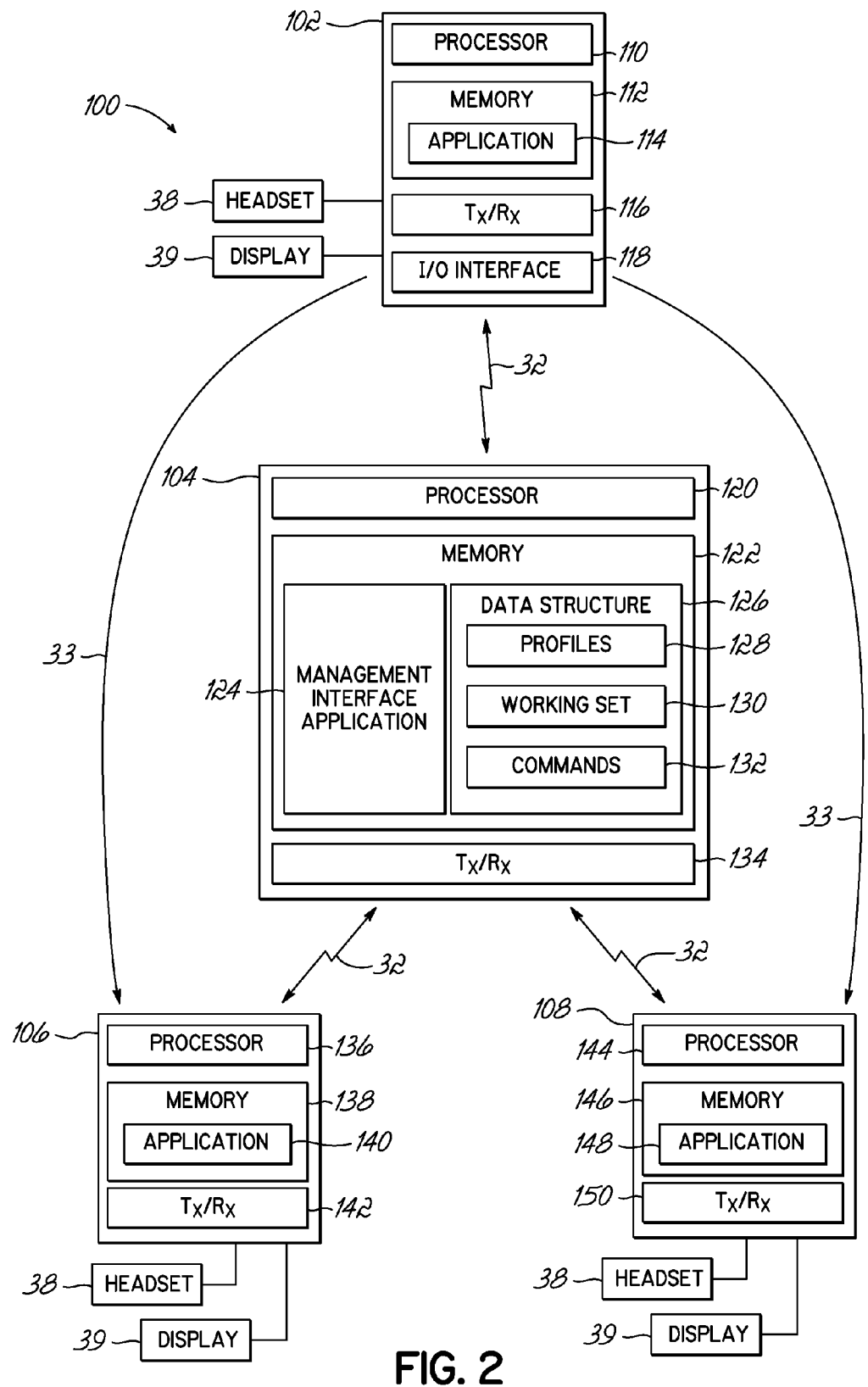
FIG. 2 is a diagrammatic illustration of a at least some components of the mobile devices and management computer of FIG. 1.

Referring now to FIG. 2, which provides a mobile device management system 100 consistent with some embodiments of the invention. Mobile device management system 100 includes mobile management device 102, management computer 104, mobile host device 106 and mobile host device 108. Similar to FIG. 1, mobile device management system 100 may be utilized by a supervisor and workers, where mobile management device 102 may be utilized by a supervisor to manage workers and mobile host devices 106 and 108 through management computer 104. As shown in FIG. 2, mobile management device 102, management computer 104, and mobile host devices 106, 108 may be in communication over a common communication network 32.

Mobile management device 102 includes processor 110 and memory 112, where memory 112 includes application 114 resident in memory 112, where application may comprise one or more operations configured to be executed by processor 110. Such application 114 may include the software applications necessary for implementing the speech recognition and text-to-speech (TTS) functionality of the device. In addition, mobile management device may include transceiving circuitry 116 to transmit and receive communications from management computer 104, mobile host device 106, and/or mobile host device 108 over communication network 32. Mobile management device 102 may further comprise I/O interface 118, which may be configured to receive input or provide outputs with respect to a variety of sources including for example, speech input out of a headset, keyboard input, button input, and/or touch screen input, barcode input from a barcode scanner, output to a display, etc. As illustrated in FIG. 2, device 102 may be coupled to a headset 38 for a speech interface. Device 102 might also have a functional display 39, which may be coupled to the device as a peripheral device, or may be integrally included within the housing. As further shown in FIG. 2, the other host devices 106, 108, which are operated upon by a supervisor using device 102, also will utilize headsets 38 and/or displays as appropriate. For example, the various devices 102, 106, and 108 might all be operational and functional with speech recognition and text-to-speech (TTS) functionality so that they may be operated as speech devices within an overall speech-directed system. One of the devices worn by a supervisor might then be functional in accordance with the invention to provide a management application 114 for managing the other devices 106, 108. Similarly, in some embodiments a device worn by a supervisor, such as mobile management device 20, may be managed by another device (e.g., device 22, 24) executing the management application, and a device worn by a supervisor (e.g., mobile management device 20) may also execute the management application 114 to manage that same device (e.g., mobile management device 20).

Management computer 104 includes processor 120 and memory 122, where memory 122 may include management interface application 124 resident thereon, where management interface application 124 may comprise one or more operations configured to be executed by processor 120. Management interface application may include a management interface configured to receive input data generated from the mobile management device 102, which may be initialized such that the mobile management device 102 may interface with the management computer 106 over the communication network. In addition, memory 122 may further include data structure 126, where data structure 126 may include stored device profiles 128, working set data 130, and/or stored command functions 132, where the stored command functions may be accessed by the management interface application 124 and executed by processor 120. Management computer 104 may further comprise transceiving circuitry 134, where transceiving circuitry may be connected to communication network 32, and configured to transmit and receive data to and from mobile management device 102, mobile host device 106, and/or host device 108.

Mobile host device 106 includes processor 136 and memory 138. Memory 138 may further include application 140 resident thereon, where application 140 may comprise one or more operations configured to be executed by processor 136, such as the speech recognition and TTS functionalities. Host device may further comprise transceiving circuitry 142, where transceiving circuitry 142 may be connected to communication network 32 and configured to transmit and receive data to and from mobile management device 102, management computer 104, the central system computer 28, and/or mobile host device 108.

Mobile host device 108 includes processor 144 and memory 146. Memory 146 may further include application 148 resident thereon, where application 148 may comprise one or more operations configured to be executed by processor 144, such as the speech recognition and TTS functionalities. Host device may further comprise transceiving circuitry 150, where transceiving circuitry 150 may be connected to a communication network and configured to transmit and receive data to and from mobile management device 102, management computer 104, the central system computer, and/or mobile host device 106. While only one management device 102 and two host devices are illustrated, the invention is not limited to the number of such devices.

Referring to FIG. 2, device applications 114, 140, 148 may be configured to include one or more operations associated with a device profile, device application, or device data, such that as a device profile, application, or data may be loaded onto a mobile device to be executed by the respective processor of the device.

Those skilled in the art will recognize that the exemplary environment illustrated in FIGS. 1 and 2 are not intended to limit the invention. Indeed, those skilled in the art will recognize that other alternative hardware and/or software environments, and incorporating different numbers and configurations of hardware resources, may be used without departing from the scope of the invention. Those skilled in the art will also recognize that the invention contemplates all types of computing systems, including computing systems and other programmable electronic devices configured with processors, memory and/or storage devices, including, for example, client computers, server computers, portable computers, handheld computers, embedded controllers, etc.

Figure 3:
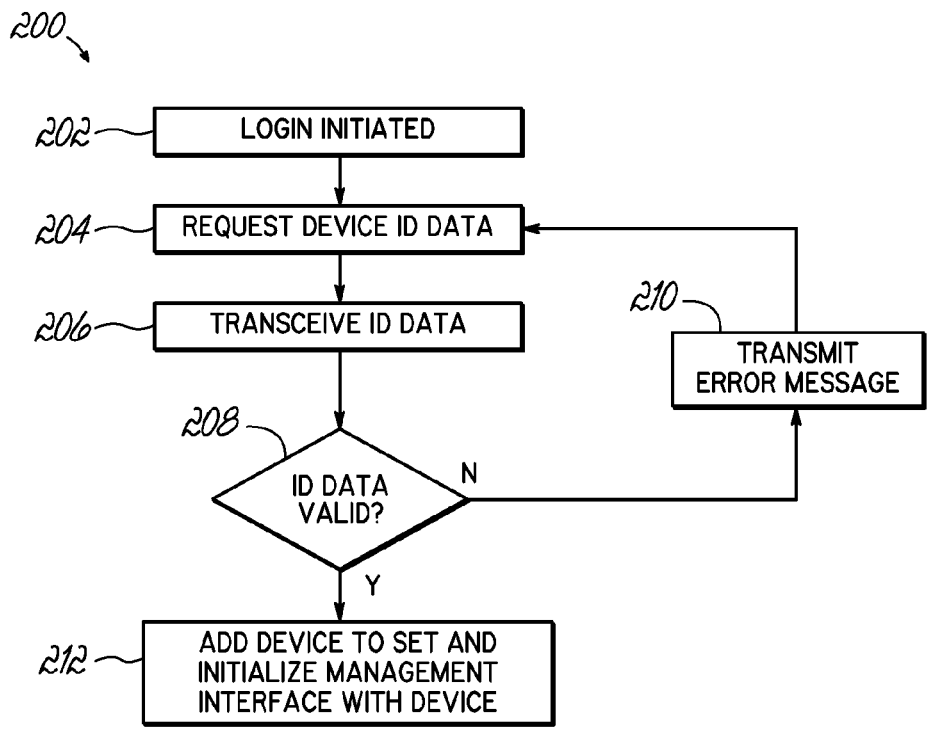
FIG. 3 is a flowchart illustrating a sequence of operations to allow a mobile device to log in to initialize a management interface on a management computer consistent with some embodiments of the invention.

Referring now to FIG. 3, which provides flowchart 200, where flowchart 200 provides a sequence of operations that may be performed by embodiments consistent with the invention for beginning remote management of one or more devices using device 102.

A supervisor or other user would log into a management application 114 on device 102. Once a supervisor is logged in using their device 102 that device will act as a management device, and a list or set of devices would then be assembled to indicate which host devices 106, 108 the supervisor would be managing, as discussed below. As shown in flowchart 200, a mobile management device 102 may communicate with a management computer consistent with embodiments of the invention, such that mobile management device 102 may securely communicate with the management computer. The mobile management device 102 may initiate a login to the management computer (block 202), such as with speech. In some embodiments, login may also be dynamic, and not require input from a user, if the mobile management device 102 dynamically identifies itself as a management device to the management computer. For example, a mobile management device 102 may communicate a unique identifier associated with a supervisor and/or the device to the management computer. In other embodiments, a user of the mobile management device 102 may initiate login by powering on the mobile management device 102, pressing one or more buttons on the mobile management device 102, and/or inputting one or more vocal commands and/or identifiers (e.g., an employee identification number and/or a unique password) using the headset associated with the mobile management device 102. Additionally, in some embodiments, the user may utilize a barcode scanner associated with the management device 102 to scan an identification object, such as an employee badge, to thereby provide identification for login.

The management computer 104 may request device identification (ID) data from the mobile management device to identify one or more devices 106, 108 to be managed.

The identification of the one or more devices 106, 108 may be captured in a number of ways. For example, if the supervisor is near the host device to be managed, an ID associated with that host device might be scanned, such as using a barcode reader or an RFID reader. Alternatively, a Bluetooth link 33 might be established between the supervisor device 102 and a host device 106, 108 for extracting ID information, such as a serial number from the host device 106, 108. That information might then be used by the management computer 104 to identify the device 106, 108. In another alternative embodiment, the device ID might be spoken. The request for the ID data may be sent to the user of the mobile management device by generating an audio request using the headset 38 associated with the mobile management device 102 (block 204). In other embodiments, the management computer may request identification data by providing one or more visual requests to a user of the mobile management device using a display 39, and/or visual indicators associated with the mobile management device. As such, the management computer may request identification data from a user of the mobile management device to assemble a working list of devices.

The identification data may be transmitted from the mobile management device and received by the requesting management computer, i.e., the identification data is transceived (block 206). In some embodiments, a user may verbally input a unique device identifier associated with the manager into the mobile management device using the headset associated with the mobile device, and the mobile device may capture the verbally input identifier, analyze the captured speech input, and generate identification data based at least in part on the captured speech input. In some embodiments, a user may input unique identification data to the mobile management device using one or more input methods, as noted, such as readers, scanners, and/or a Bluetooth connection.

The management computer may analyze the received identification data to determine whether the received identification data is valid (block 208). In some embodiments, the management computer may compare the received identification data to stored key data which includes data corresponding to valid identification data for various device devices 106, 108. In some embodiments, a data entry resident on a memory associated with the management computer may include stored data indicating one or more unique identification numbers associated with devices, and the management computer may compare the received identification data to the stored data to determine whether the received identification data corresponds to a unique identification number.

In response to determining that the received identification data is not valid, the management computer may transmit error message data to the mobile management device (block 210). The error message data may be reproduced as speech at the mobile management device using the headset associated with the mobile management device, thereby notifying a user of the mobile management device that the provided identification data is not valid for a device. Based at least in part on the received audio error message data, the mobile management device may again request identification data from the user of the mobile management device (block 204).

If the management computer determines that the received identification data is valid, the management computer adds the device to a working set and initializes a management interface between the mobile management device and the management computer (block 212), so the devices 106, 108 may be managed. In some embodiments, the headset associated with the mobile management device captures speech, and the mobile management device converts the captured speech into identification data, thereby allowing a user of the mobile management device to interface with the management computer, and develops a working set of devices for management substantially hands-free using a speech dialog. These advantages are desirable in workplace environments requiring hands-free and/or visual awareness of surroundings for safety reasons, and/or workplace environments with hostile conditions where display screens may not function correctly. In addition, a hands-free mobile device consistent with some embodiments may increase worker efficiency by allowing the worker to process multiple streams of information naturally (e.g., following instructions to visually locate an object). Furthermore, the present invention allows a supervisor to manage and control multiple devices while they are on the go, and does not require the supervisor to return to the location of a management computer. For example, a distribution center may be acres in extent, with a management computer 104 being located at only one point in the center. Hence, not requiring the supervisor to return to the location of the management computer may be provide a valuable benefit to utilizing the system, and may reduce work delays, may increase work efficiency, and/or provide other such similar benefits.

Figure 4:
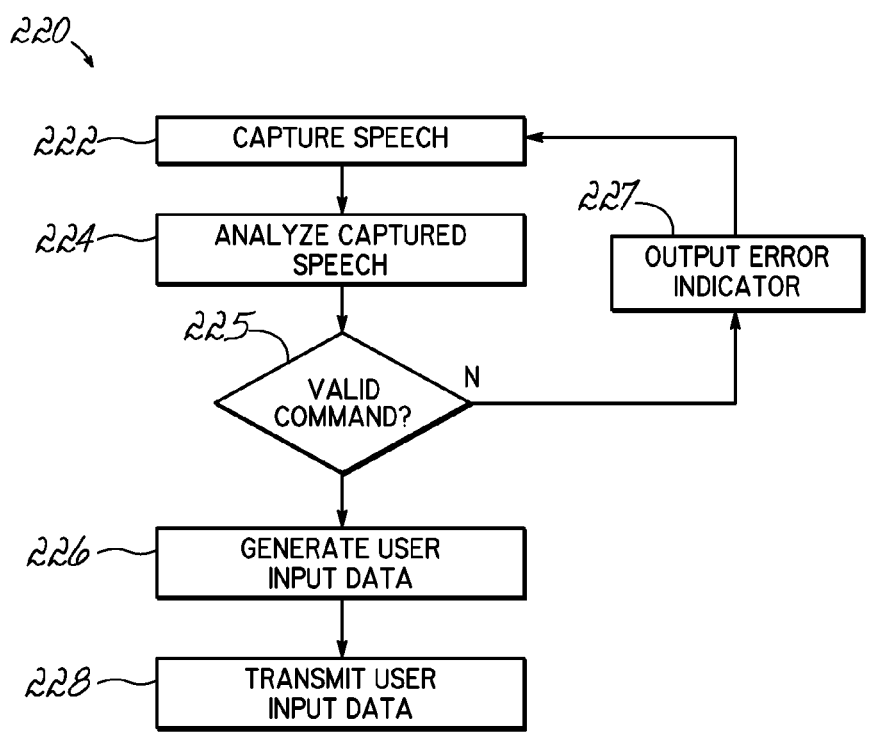
FIG. 4 is a flowchart illustrating a sequence of operations to capture speech of an operator using a mobile device and generate input data therefrom consistent with some embodiments of the invention.

FIG. 4 provides flowchart 220, which illustrates sequences of operations that may be performed by mobile management devices consistent with some embodiments of the invention. A headset associated with a mobile management device may capture speech of a user of the mobile management device (block 222). The mobile management device analyzes the captured speech (block 224), such as by using speech recognition. The mobile management device determines whether the captured speech is a valid command (i.e., if the speech corresponds to a recognized command, and/or a valid selection of a menu) (block 225). In response to determining that the captured speech is a valid command ("Y" branch of block 225) the mobile management device generates user input data based at least in part on the captured and recognized speech (block 226). In response to the mobile management device determining that the captured speech is not a valid command ("N" branch of block 225), the mobile management device may provide the user with an error notification (e.g., a sound, a visual notification) (block 227), and the mobile management terminal may return to an input operation to capture user speech (i.e., return to block 222). The mobile management device transmits user input data to a management computer (block 228). This allows remote control of the management computer, and the applications run on the management computer.

In accordance with another aspect of the present invention, once a set of devices has been developed, the communication link, such as through network 32, is established between not only the supervisor device 102, but also one or more host devices 106, 108, to link the device devices with the management interface application 124, for providing the necessary management and modification of the device devices 106, 108, utilizing speech inputs and other inputs through the supervisor device 102. To that end, a series of commands may be sent to the management computer 104 using device 102, and the management computer, through the management interface application 124 and other applications 128, 130, 132 will then send the commands to the various mobile devices 106, 108 in a conventional manner. For example, a management interface application, such as VoiceConsole® is available from Vocollect, Inc. of Pittsburgh, Pa. for managing device devices. Utilizing the present invention, a supervisor may command one or more devices 106, 108 remotely, without having to be located at the management computer 104. Rather, the supervisor, such as supervisor 10 in FIG. 1, may move around the workspace and manage and configure devices of users 12 and 14 without having to be in the location of management computer 30, 104.

As such, embodiments of the invention facilitate interfacing with a management computer executing device management software via a mobile device having limited hardware functionality (e.g., few buttons, no screen, low processing speed, limited memory capacity, and/or other such hardware limitations). For example, in some embodiments, a mobile device being utilized as a mobile management device may allow a user to interface only through verbal input and output. In this exemplary embodiment, the user may interact with the management computer to manage mobile devices utilizing the mobile management device with verbal inputs and outputs. Furthermore, in some embodiments of the invention, the management computer may execute one or more specialized operations when interfacing with a mobile management terminal, where the specialized operations may facilitate interfacing with the limited hardware of the mobile management device For example, in some embodiments a mobile management terminal may not include a display, and the management computer may execute specialized operations when interfacing with the mobile management computer, including for example, employing a working set, such that a user may select host devices to manage efficiently. Advantageously, embodiments of the invention may be more efficient in distributed workplace environments as opposed to hand-held devices executing device management software.

Figure 5:
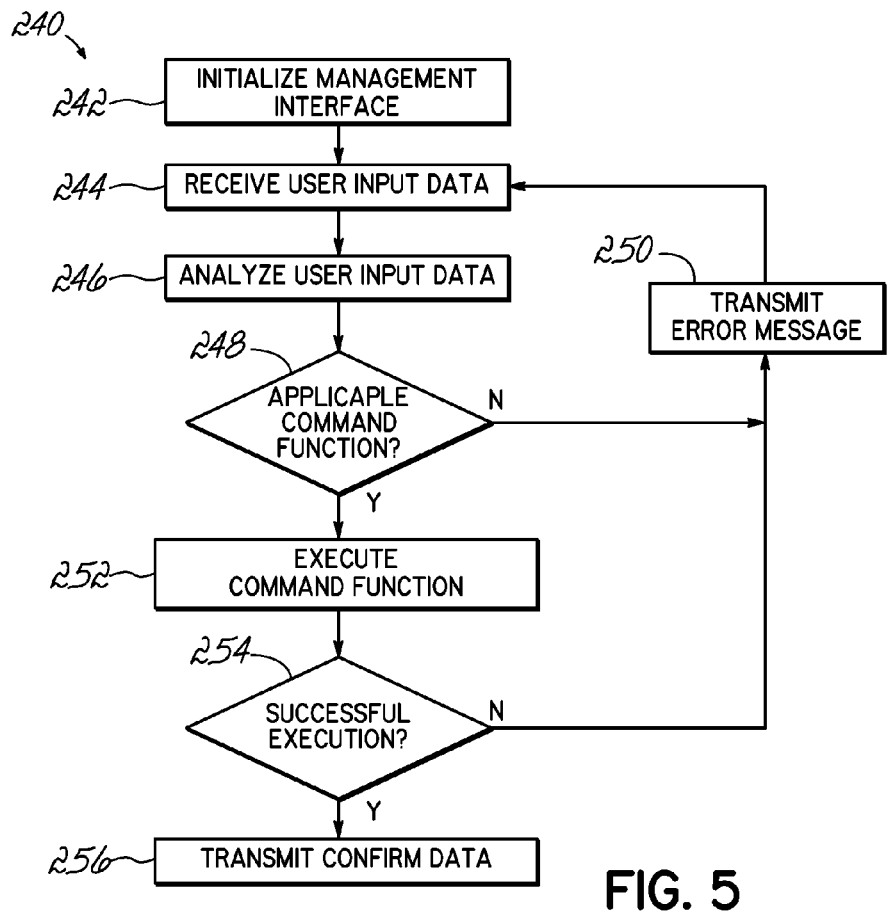
FIG. 5 is a flowchart illustrating a sequence of operations to transmit a stored device profile to a mobile host device consistent with some embodiments of the invention.

FIG. 5 provides flowchart 240, which illustrates sequences of operations that may be performed by a management computer consistent with some embodiments of the invention. In flowchart 240, a management computer initializes a management interface (block 242) corresponding to a mobile management device. The mobile management device may receive user input data from the user (block 244), such as the speech captured from a microphone associated with the mobile management device and/or data based on the captured speech.

The management computer may analyze the user input data (block 246), and the management computer may determine whether the command function indicated by the user input data is an applicable command function (block 248); i.e., the management computer determines whether the command function indicated by the user speech data is executable based on the current execution path of the device management software executing on the management computer. For example, if the user is navigating a menu using the mobile management terminal interfacing with the management computer, there may be a limited number of command functions that may be executable within the menu that the user is navigating. Similarly, the management computer may analyze the command function indicated by the user speech data to determine whether requisite data has been previously input to determine whether the command function is applicable. For example, if the user input data indicates a command function to load a device profile to a working set of host devices, but the working set of host devices is empty (e.g., the user of the mobile management device forgot to load devices to the working set before verbally inputting a command to load a desired device profile to the working set), the management computer may determine that the command function indicated by the input user speech data is not applicable. In addition, in some embodiments, the management computer may determine that the command function indicated by the input user speech data is not applicable when the user input data requests a command that is not compatible with one or more mobile devices in the working set. For example, user input data may indicate a language to load to mobile devices in the working set which one or more of the devices in the working set do no support, and the management computer may determine that the command function is not applicable.

In response to determining that the command function indicated by the user speech data is not applicable ("N" branch of block 248), the management computer may transmit an error message to the mobile management device (block 250). The error message may include data indicating that the command function indicated by the user speech data was not executed by the management computer. In addition, in some embodiments the error message may indicate additional information based on the command function indicated by the user input data and/or other such data stored in the management computer. The error message may include data indicating why the command function was not executed. For example, if the working set was empty and the command function performs operations based on the host devices indicated by the working set, the error message may include data indicating that the working set was empty. If a mobile device of the working set does not support a language that is requested to be loaded, the error message may include data indicating such reason.

In response to the management computer determining that the command function indicated by the user input data is applicable ("Y" branch of block 248), the management computer may execute the command function (block 252) to thereby perform one or more operations corresponding to the command function. Following execution of the command function, the management computer may determine whether the command function was executed successfully (block 254). For example, if a command function when executed transmitted a desired device profile to host devices indicated by the working set, and the management computer fails to transmit the desired device profile to one or more of the host devices indicated by the working set, the management computer may determine that the command function was not executed successfully. A command function may fail to execute successfully or may execute only partially successfully (e.g., a device profile transmits successfully to some host devices indicated in by the working set but not all indicated host devices) for a variety of reasons, including for example, communication network issues, memory access issues, execution errors, and/or other such problems associated with distributed communication and computing systems.

In response to determining that the command function did not execute successfully ("N" branch of block 254), the management computer may generate and transmit an error message to the mobile management device (block 250). The error message may include data indicating that the command function failed to execute successfully. In some embodiments, the error message may include data indicating one or more reasons why the command function did not execute successfully. For example, if the management computer did not successfully transmit a device profile to a particular host device due to communication network issues, the error message may include data indicating that the management computer did not communicate successfully with the particular host device. In some embodiments, in response to a command function executing partially successfully, the error message may include data indicating the operations that were performed successfully and the operations that were not performed successfully.

In response to receiving an error message, a mobile management device may reproduce a sound notification for a user of the mobile management device. For example, in some embodiments, data of the error message may be analyzed by the mobile management device utilizing a text-to-speech engine executing on the mobile management device, and the mobile management device may reproduce verbal notification using a speaker associated with the mobile management device based on the data of the error message.

In response to determining that the command function executed successfully ("Y" branch of block 254), the management computer may transmit a confirmation message to an interfacing mobile management device. The confirmation message may include data indicating that the management computer successfully executed a command function. In some embodiments, the confirmation message may include data based at least in part on the executed command function, and/or data based on host devices indicated in the working set. In some embodiments, the confirmation message may include data indicating simply that the management computer successfully executed a command function. In response to receiving a confirmation message, the mobile management device may reproduce a sound to notify to the user that a command function was executed successfully by the management computer. For example, in some embodiments, the reproduced sound may comprise a standard tone such as a "BEEP." In some embodiments the reproduced sound may include words generated by a text-to-speech engine executing on the mobile management terminal based on the received confirmation message. For example, the sound may notify the user of the command function executed, data utilized by the executing command function, and/or the identifiers of host devices, such as "Profile 2.0 loaded to devices 00100 and 00102."

While the user input data may take other non-speech forms, in one embodiment, a headset associated with the mobile management device captures user speech, and the mobile management device performs speech recognition and generates user input data based at least in part on the captured user speech. The user input data is analyzed by the mobile management device. In some embodiments, the management computer will hold the data that the user has input. In addition, in some embodiments each discrete piece of data captured by the mobile management device may be sent to the management computer as well as stored on the mobile management device, such that the captured data may be operated on by either the mobile management device or the management computer. On completion of the input phase of the command cycle, the command may be issued to the management computer. The management computer may then execute stored command functions based at least in part on the user input data. As such, in these embodiments, a user of a mobile management device speaks to the mobile management device, and the management computer executes stored command functions based at least in part on the speech of the user to control one or more devices 106, 108.

The supervisor device 102 analyzes the user input data (block 246), such as a spoken command, and determines whether the command is valid (block 248). If the command is valid, the command is then sent by the device 102 to the management computer 104 to be implemented by the management interface application 124 for managing one or more of the devices from a working set of devices. In accordance with the invention, the management interface application 124 then sends the command to one or more of the devices 106, 108, and the command is otherwise executed by the management interface application. As noted above, management interface applications, such as VoiceConsole®, may be controlled utilizing the invention so that various device devices 106, 108 might be managed, such as by loading device profiles, tasks, speech recognition parameters, applications, and other data associated with the operation of the device devices 106, 108. Therefore, the execution of a stored command function associated with block 252 includes sending the command to the manager at computer 104 in accordance with the invention, and then executing or sending the command to a mobile device 106, 108 in accordance with the conventional management of such devices.

Table 1 illustrates an exemplary command set and notes the resulting execution of a particular command, including, in some commands, the speech dialog implemented between a supervisor 10 and a supervisor device 102. A further example of the execution of such commands is discussed further herein below to provide an exemplary description. However, it will be readily understood that the present invention is not limited only to specific commands, and thus, other commands might be implemented in accordance with the principles of the present invention.

| Command | Additional Input | Result |
|---|---|---|
| Scan Device Serial Number | — | Implicitly selects that device as a subject of the 'current' or 'next' operation. (Scanning a barcode associated with a mobile device implicitly selects the mobile device as the subject of the next operation and/or adds the device to the working set). |
| Describe | None | Device type, serial number, current software being executed (analogous to current Voice Application). |
| List . . . | — | If a display is present, the resulting list is shown on the display. If not, the list is spoken to the supervisor-operator. If no objects are available for the list, a message to that effect is spoken to the supervisor-operator. In the event that a list must be spoken, the length of the list must be less than (some configurable number). |

-continued

| Command | Additional Input | Result |
| --- | --- | --- |
| List Tasks | None | List the software available for the devices. If devices are identified (e.g., in the working set), only the software available for those devices are listed. |
| List Operators | None | List all of the operators in the system (e.g., in the working set). |
| List Devices | None | List all of the devices in the system (e.g., in the working set). |
| List Profiles | None | If devices are present, profiles compatible with the devices are listed, or a message is spoken stating no profiles are compatible. |
| List Voices | None | List the voices available in the system. If devices are selected, only those voices loadable to the selected devices are listed |
| Select | Identification for the item to be selected (the following commands require one or more 'select' operations) | Valid command after a list. Identifies one item to operate with, to be applied to the device(s) identified. Devices may be identified before or after an item is selected from a list. E.g., oper: "List profiles" device: "3.7 for T5, 4.0 for T5" oper: "One" (this includes an implicit 'select' by selecting the item from the list; by stating the number of the item from the list, the operator has selected that item as the operand of the command, where the targets are the devices listed in the working set) device: "3.7 for T5" oper: "Yes" oper: scans device device: "T5, 2034567" oper: "Load profile" device: "Load profile 3.7 for T5 to device 2034567?" |
| Load Profile | Profile identification, or prior 'select' of a profile | |
| Load Operator | Operator identification, or prior 'select' of an operator | Operator data is sent to mobile device. |
| Load Task | Task identification, or prior 'select' of a task | Workflow software is sent to the device. |
| Load Voice | Voice identification, or prior 'select' of a voice | Voices ('TTS') is sent to the device. |
| Start Logging | Number of hours to keep logging | A command is issued to the device to commence logging. |
| Stop Logging | | A command is issued to the device to stop logging. |
| Change Logging Level | | A command is issued to the device to change the logging level. |
| Send Message | Voice recording | Recorded voice message is sent to the indicated devices or operators |

In accordance with some embodiments of the invention, certain commands may be associated with menus or lists, which provide additional selections for use in subsequent commands. That is, a menu or list is generated, and the supervisor may select from that generated list in order to proceed with another command using the selected menu option or data. For example, as illustrated in Table 1 and discussed further herein below, various of the commands might include a "List" command. Pursuant to such a List command, a list or menu of selectable data might then be presented. In one embodiment of the invention, the menu is presented by speech. In another embodiment of the invention, the menu data might be displayed if a display is available with, or coupled to, the supervisor device 102.

Figure 6:
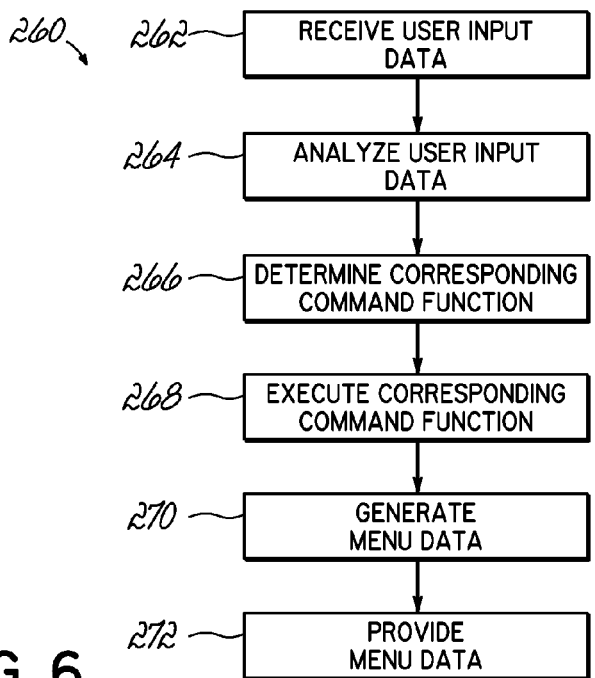
FIG. 6 is a flowchart illustrating a sequence of operations to transmit response data to a mobile management device in response to user input data received from the mobile management device consistent with some embodiments of the invention.

Referring now to FIG. 6, which provides flowchart 260 associated with a menu operation of the invention. Flowchart 260 illustrates a sequence of operations that may be performed by embodiments consistent with the invention. A mobile management device receives user input data, such as speech data (block 262). The mobile management device may analyze (e.g., speech recognition) the user input data (block 264), and determine the command function corresponding to the user input data (block 266). If it is a valid command (see FIG. 5), then the mobile management device may transmit data to the management computer to be executed by the management interface to cause the management computer to execute the stored command function (block 268). Execution of that stored command function may implement the provision of one or more menus.

The management computer generates response data, including for example, menu data based at least in part on the executed command function (block 270). For example, the menu data generated by the management computer may be data selections, such as a list of devices. The menu data may be in the form of a data that may be reproduced by the mobile management device such that an audio menu including spoken menu options may be spoken to the supervisor through a headset, or in some embodiments, the menu data may be displayed on a screen associated with the mobile management device. The menu data may include one or more menu selections to choose from. The menu selections might be associated with other command functions that may be executed in response to the menu function in block 270. For example, the management computer may execute a command function that includes optional execution paths for execution, and the menu data may include menu selections, where the menu selections present a user of the mobile management device with the optional execution paths for execution. The menu selections are provided as speech to the user through the headset or displayed as noted. The mobile management device provides the menu data to the supervisor (block 272), such as to be spoken/displayed by the management device to a supervisor.

As noted above, if a command generates a menu, the menu data or menu selections might be used for additional commands. That is, a menu selection might provide a profile to be loaded onto a device, a particular device from the working set of devices, or other applications or data to be loaded onto a device for managing such a device, for example. To that end, FIG. 7 illustrates a possible flow associated with utilizing menu selections for additional commands.

Figure 7:
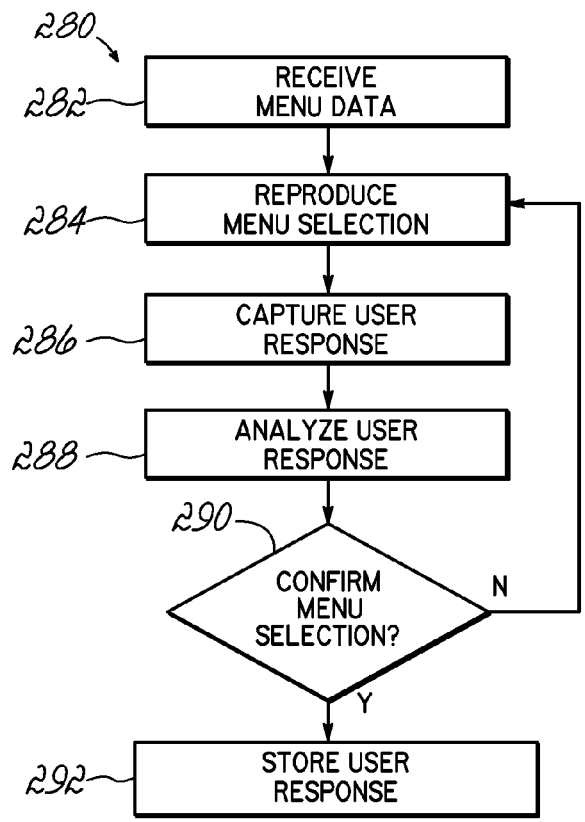
FIG. 7 is a flowchart illustrating a sequence of operations to generate user input data consistent with embodiments of the invention.

FIG. 7 provides flowchart 280, which illustrates a sequence of operations that may be performed by embodiments consistent with the invention. Referring to flowchart 280, a mobile management device may receive response data, including for example, menu data from a management computer (block 282), where the menu data may include one or more menu selections. The mobile management device may reproduce the menu selections using a headset speaker or display associated with the mobile management device, and the mobile management device prompts the user for input (block 284). The mobile management device may wait for a user response to the prompt associated with the reproduced menu selections. The mobile management device 102 captures the user response (block 286). For example, the menu reproduced to the user may be based on a menu executing on the management computer, and the mobile management terminal would prompt the user to advance through the series of options. In some embodiments, the user response may include a spoken response and a headset associated with the mobile management device may capture the user response as user speech data. In some embodiments, the user response may include a button input from one or more buttons associated with the mobile management device to select a response on a display. The mobile management device may analyze the user response (block 288). The device 102 may then confirm the menu selection (block 290) by speaking or displaying it so the user may confirm it using speech or a display selection.

If the mobile management device determines that the user does not confirm the reproduced menu selection, the mobile management device returns to block 284, and reproduces a second menu selection of the menu data, and the process repeats. If the mobile management device determines that the user confirms the reproduced menu selection, the mobile management device stores the response for use with a later command (block 292). In addition, in some embodiments, the management device may transmit the response to the management computer for storage at the management computer, and the response may be retrieved from the management computer. As such, in some embodiments, the mobile management device may push data to the management computer for storage, and the mobile management device may retrieve the pushed data from the management computer in response to needing the pushed data for execution of one or more operations. Furthermore, the pushed data may be stored in the management computer such that the pushed data includes an identification which identifies the user (e.g., supervisor) associated with the data.

Figure 8:
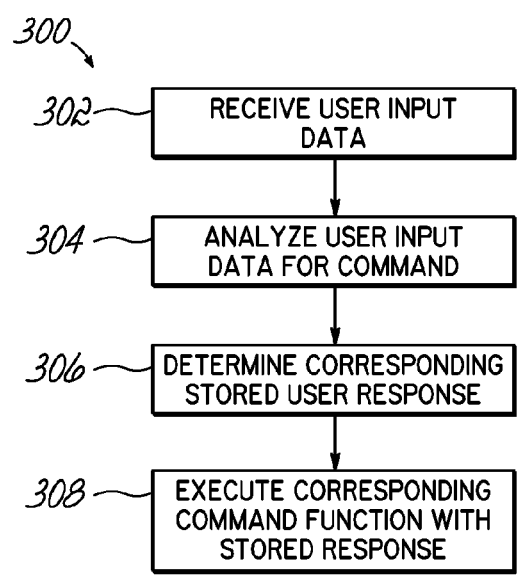
FIG. 8 is a flowchart illustrating a sequence of operations to execute command functions based at least in part on user input data consistent with embodiments of the invention.

FIG. 8 provides flowchart 300, which illustrates a sequence of operations that may be performed by some embodiments consistent with the invention when a stored menu selection is available for a command. A mobile management device may receive user input data (block 302). As described above with reference to FIG. 7, a stored user response may be generated by a mobile management device. The mobile management device analyzes the user input data for a command (block 304), and determines if there is a stored corresponding user response (block 306). The mobile management device will then interface with the management computer to cause the management computer to execute the command function corresponding to the stored response data (block 308).

Figure 9:
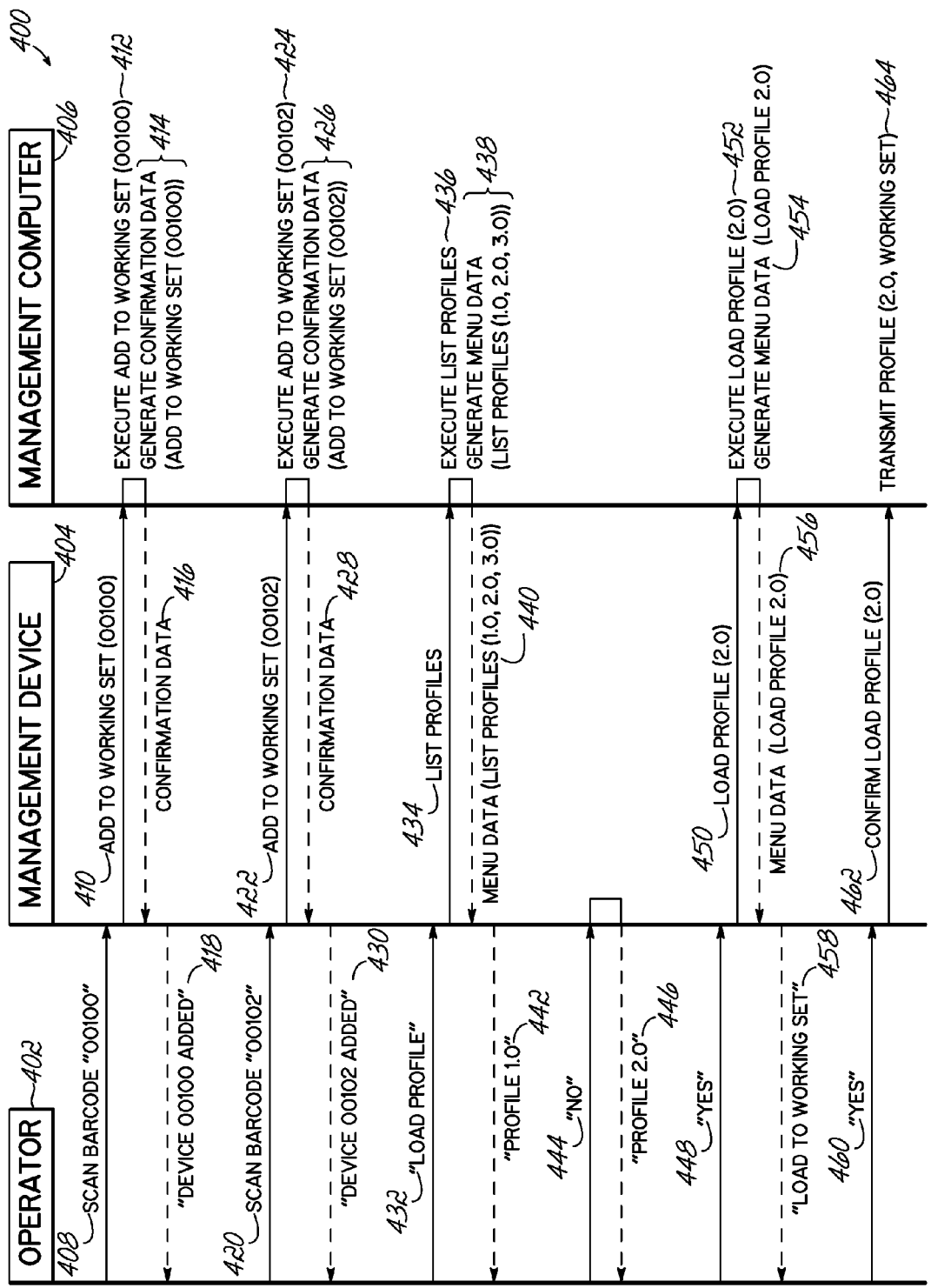
FIG. 9 is a diagrammatic illustration of an exemplary routine that may be performed by systems consistent with some embodiments of the invention to manage mobile host devices using a mobile management device interfacing with a management computer.

Referring now to FIG. 9, which provides routine 400 which illustrates an exemplary sequence of operations which may be executed by embodiments consistent with the invention. As shown in routine 400, an operator 402 (e.g., a user, supervisor, etc.), may provide input to a mobile management device 404 (solid arrows from the operator 402 to the management device 404), and likewise, the operator 402 may receive output from the management device 404 (dashed arrows from the mobile management device 404 to the operator 402). Moreover, the mobile management device 404 may transmit data to a management computer 406 (solid arrows from the management device 404 to the management computer 406), and likewise, the management computer 406 may transmit data to the mobile management device 404 (dashed arrows from the management computer 406 to the mobile management device 404).

Routine 400 illustrates an exemplary sequence of operations that may be performed by an operator 402 using a mobile management device 404 to interface with a management computer 406 to manage mobile host devices, where the mobile host devices include five digit device identification numbers. In this exemplary illustration, mobile host devices having device identification numbers 00100 and 00102 are remotely managed by operator 402. These device identification numbers may be represented by barcodes associated with each mobile host device, and mobile management device 404 may include a barcode scanner associated therewith, and mobile management device 404 may be configured to receive input data from the associated mobile barcode scanner.

Operator may scan the barcode associated with mobile host device 00100 using the barcode scanner of the mobile management device 404, and barcode data identifying mobile host 00100 may be input into the mobile management device 404 (block 408). In response to the input barcode data for device 00100, the mobile management device 404 generates user input data based at least in part on the input barcode data and transmits the user input data to the management computer (block 410). In some embodiments, the generated user input data may include and/or be based at least in part on the user speech data and/or button input data. In some embodiments, the generated user input data may be command function data associated with command functions stored in the management computer, such that the mobile management device 404 may generate command function data based at least in part on the user input data and/or the management computer 406 to which the user input data will be transmitted.

The management computer 406 receives the user input data, and executes a command function associated with the received user input data. In the example, the management computer 406 adds the device identifier 00100 to a working set (block 412), where the working set includes data that identifies mobile host devices that the mobile management device may manage. The working set may comprise a data structure stored in a memory associated with the management computer 406, and the management interface of the management computer 406 may access, read, and write to the working set. Based at least in part on executing the command function to add the device identifier 00100 to the working set, and/or on the received user input data, the management computer 406 generates confirmation data, where the confirmation data may be configured to inform the operator 402 that device identifier 00100 was successfully added to the working set upon reproduction of the confirmation data to the operator 402 by the mobile management device 404 (block 414). As such, in some embodiments, the management computer 406 may send back confirmation data indicating success, failure, and/or an error in response to receiving user input data from the mobile management device 404. An audio response may be generated by the mobile management device 404 based at least in part on the confirmation data received from the management computer 406. In some cases, response data may be generated by the management computer 404 in the form of lists of data (e.g., available profiles, mobile devices in the working set). This is done to save processing on the management computer 406 and allow the management device 404 to manage the language in which the audio response is generated.

The management computer 406 transmits the confirmation data to the mobile management device (block 416). Based at least in part on the received confirmation data, the mobile management device reproduces an audio confirmation that device 00100 was successfully added to the working set (block 418).

Consistent with the exemplary operations described above, the operator 404 scans the barcode associated with device 00102 (block 420), and the mobile management device 404 transmits the user input data to the management computer (block 422). The management computer 406 executes the command function to add device 00102 to the working set (block 424), and the management computer 406 generates confirmation data (block 426). The confirmation data may be transmitted from the management computer 406 to the mobile management device 404 (block 428), and the mobile management device 404 reproduces an audio confirmation that device 00102 was successfully added to the working set to the operator 402 (block 430).

To load a stored device profile on devices 00100 and 00102, the operator 402 provides a verbal command to the mobile management device 404, and the mobile management device may capture the verbal command using an associated headset microphone as user speech data (block 432). The mobile management device generates user input data based at least in part on the user speech data, and the mobile management device transmits the user input data to the management computer (block 434).

Based at least in part on the received user input data, the management computer executes the stored command function required to determine which device profiles may be stored in a memory associated with the management computer (block 436). Based at least in part on the determined stored device profiles, on the received user input data, and/or the executed command function, the management computer 406 generates menu data, where the menu data includes menu selections associated with each determined stored device profile (block 438). In this example, the management interface of the management computer accessed the memory associated with the management computer 406, and determined that device profiles 1.0, 2.0, and 3.0 were stored. Based at least in part on the determined stored device profiles, the management computer 406 generated audio menu data that included menu selections associated with device profiles 1.0, 2.0, and 3.0. The management computer 406 may transmit the menu data to the mobile management device (block 440), and the mobile management device 404 may reproduce the menu selection associated with device profile 1.0 included in the menu data for the operator 402 (block 442).

In this example, the operator does not desire to load profile 1.0, and so the operator does not confirm the menu selection, and the operator verbally inputs "NO" (block 444). As such, mobile management device 404 reproduces the next menu selection, "profile 2.0" (block 446). In this example, operator 402 desires to load profile 2.0, so operator verbally speaks or inputs "YES" (block 448). Mobile management device 404 generates user input data based at least in part on the verbal input and/or the reproduced audio menu selection, and the mobile management device 404 transmits the user input data to the management computer (block 450). Based at least in part on the received user input data, the management computer 406 executes a stored command function to load profile 2.0 (block 452). Based at least in part on the executed command function, the management computer 406 generates menu data (block 454), where the menu data includes one or more menu selections. The generated menu data is transmitted from the management computer 406 to the mobile management device 404 (block 456), and the mobile management device reproduces a first menu selection included in the received menu data (block 458). In this example, the operator 402 is queried as to whether device profile 2.0 should be loaded to the mobile host devices identified in the working set. The mobile management device 404 waits for a response from the operator to the reproduced menu selection, and in exemplary routine 400, the operator 402 verbally replies "YES" (block 460). The mobile management device 404 captures the operator's speech using a headset associated with the mobile management device 404, and the mobile management device 404 generates user input data based at least in part on the captured speech.

The mobile management device 404 transmits the generated user input data to the management computer 406 (block 462). Based at least in part on the received user input data, the management computer then executes the command function configured to transmit device profile 2.0 to mobile host devices identified in the working set (block 464). In some embodiments, management computer 406 may generate confirmation data in response to transmitting device profile 2.0 to the mobile host devices identified in the working set, and the confirmation audio may be transmitted to the mobile management device 404 and reproduced for the operator 402.

Figure 10:
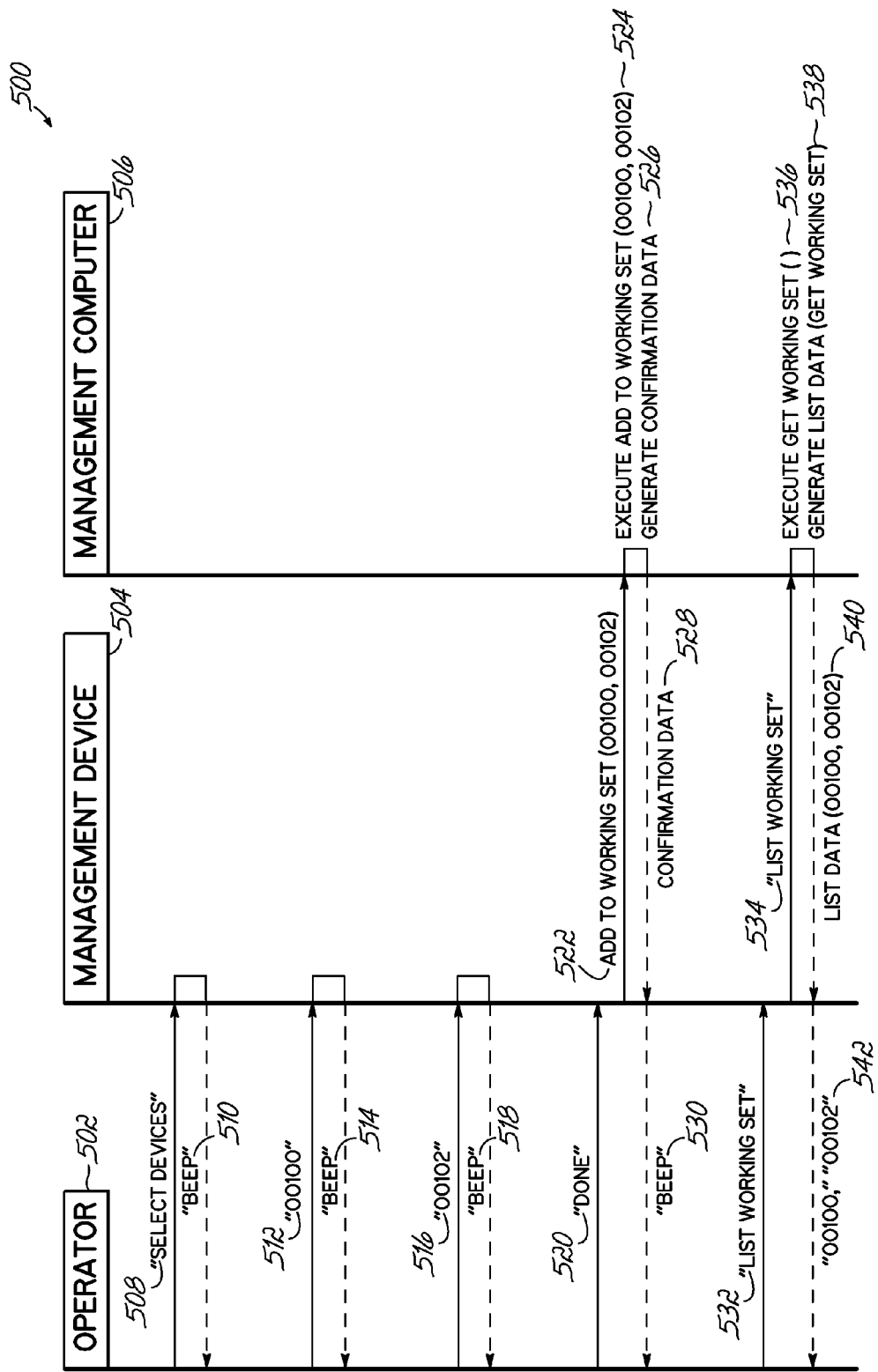
FIG. 10 is a diagrammatic illustration of an exemplary routine that may be performed by systems consistent with some embodiments of the invention to manage mobile host devices using a mobile management device interfacing with a management computer.

Referring now to FIG. 10, which provides exemplary routine 500, which illustrates an exemplary sequence of operations which may be executed by embodiments consistent with the invention. As shown in routine 500, an operator 502 (e.g., a user, supervisor, etc.), may provide input to a mobile management device 504 (solid arrows from the operator 502 to the management device 504), and likewise, the operator 502 may receive output from the mobile management device 504 (dashed arrows from the mobile management device 504 to the operator 502). Moreover, the mobile management device 504 may transmit data to a management computer 506 (solid arrows from the management device 504 to the management computer 506), and likewise, the management computer 506 may transmit data to the mobile management device 504 (dashed arrows from the management computer 506 to the mobile management device 504).

Routine 500 illustrates an exemplary sequence of operations that may be performed by an operator 502 using a mobile management device 504 to interface with a management computer 506 to manage mobile host devices, where the mobile host devices include five digit device identification numbers. In this exemplary illustration, mobile host devices having device identification numbers 00100 and 00102 are remotely managed by operator 502. Mobile management device 504 includes a headset associated therewith, such that mobile management device 504 may capture speech of the operator 502.

The operator 502 may desire to load one or more mobile host devices to a working set stored in a data structure of a memory associated with the management computer 506. Operator 502 may verbally input or speak information about the mobile host devices to add to the working set using the headset of the mobile host device 504. In this example, operator 502 initiates a load device operation on the mobile management device 504 to select devices to be loaded to the working set by speaking "SELECT DEVICES" (block 508). The mobile host device 504 captures the speech, analyzes the speech to determine one or more operations to perform in response to the captured speech, and the mobile host device 504 confirms capturing the speech and initiating the load device operation by outputting confirmation audio "BEEP" to the operator (block 510). Following the confirmation audio, the operator 502 may input one or more device identification numbers into the mobile management device 504. In this exemplary embodiment, the operator 502 verbally inputs a first device identification number "00100" (block 512, and the mobile management device 504 outputs confirmation audio "BEEP" in response to capturing the verbal input (block 514). The operator 502 verbally inputs a second device identification number "00102" (block 516), and the mobile management device 504 outputs confirmation audio "BEEP" in response to capturing the verbal input (block 518). Once the operator 502 has input all the device identification numbers desired, the operator 502 may input a command which indicates to the mobile management device 504 that the load device operation is finished. In this exemplary embodiment, the operator 502 verbally inputs "DONE" (block 520).

In response to the operator 502 indicating that the all device identification numbers have been input, the mobile management device 504 generates user input data based at least in part on the data captured during the load device operation, and the mobile host device 504 transmits the user input data to the management computer 506 (block 522)

Based at least in part on the received user input data, the management computer 506 executes a stored command function to add the device identifiers '00100' and '00102' to the working set (block 524). Based at least in part on the executed command function, the management computer 506 generates confirmation data (block 526). The management computer 506 transmits the confirmation data to the mobile management device 504 (block 528), and the mobile management device 504 reproduces confirmation audio "BEEP" for the operator 502 using a speaker associated with the mobile management device 504 based at least in part on the received confirmation data (block 530), such that the operator 502 receives notification from the mobile management device 504 that the mobile device identifiers '00100' and '00102' were successfully added to the working set by the management computer 506. As described previously, in some embodiments, the confirmation data may indicate the success or failure of executing the particular command function. As such, in some embodiments, the mobile management device 504 receives confirmation data from the management computer 506 indicating whether the command function executed correctly, and the mobile management device 504 outputs audio to the operator 502 based on whether the confirmation data indicates success or failure.

If the operator 502 desires to know which mobile host device unique identifiers have been stored in the working set, the operator may query the management computer 506 by verbal direction using the mobile management device 504. In exemplary routine 500, operator 502 speaks the "LIST" command, such as "LIST WORKING SET" (block 532). The mobile management device 504 captures the input, and mobile management device generates user input data based at least in part on the captured speech input and the command. The mobile management device 504 transmits the user input data to the management computer 506 (block 534).

Based at least in part on the received user input data, the management computer 506 determines a stored command function to execute, such that the stored command function may retrieve the stored unique device identifiers from the working set. The management computer 506 executes the determined command function (block 536), and the management computer 506 generates list data based at least in part on the received user input data, the retrieved unique device identifiers, and/or the executed command function (block 538). The management computer 506 transmits the list data to the mobile management device 504 (block 540), and the mobile management device reproduces audio confirmation to operator 502 with speech based at least in part on the received confirmation data, such that the unique device identifiers stored in the working set are reproduced for the operator 502 (block 542) using speech. In this example, the mobile management device 504 speaks "00100" and "00102."

Figure 11:
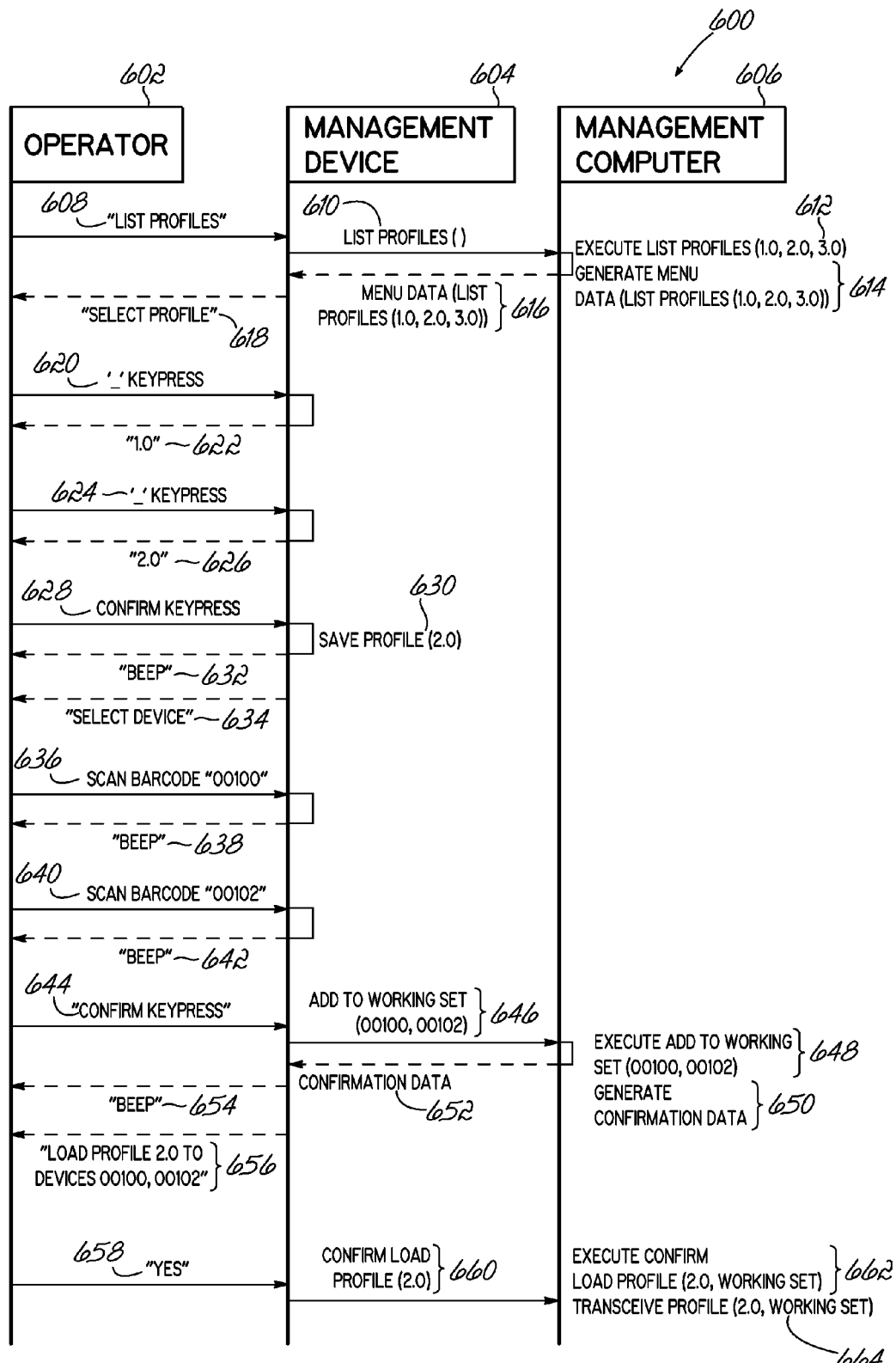
FIG. 11 is a diagrammatic illustration of an exemplary routine that may be performed by systems consistent with some embodiments of the invention to manage mobile host devices using a mobile management device interfacing with a management computer.

FIG. 11 provides routine 600, which illustrates an exemplary sequence of operations which may be executed by embodiments consistent with the invention. As shown in routine 600, an operator 602, may provide input to a mobile management device 604 (solid arrows from the operator 602 to the management device 604), and likewise, the operator 602 may receive output from the management device 604 (dashed arrows from the mobile management device 604 to the operator 602). Moreover, the mobile management device 604 may transmit data to a management computer 606 (solid arrows from the management device 604 to the management computer 606), and likewise, the management computer 606 may transmit data to the mobile management device 604 (dashed arrows from the management computer 606 to the mobile management device 604).

Routine 600 illustrates an exemplary sequence of operations that may be performed by an operator 602 using a mobile management device 604 to interface with a management computer 606 to manage mobile host devices, where the mobile host devices include five digit device identification numbers. In this exemplary illustration, mobile host devices having device identification numbers '00100' and '00102' may be remotely managed by operator 602, such that a stored device profile may be transmitted to the mobile host device. The device identification number may be represented by a barcode associated with the mobile host device, and mobile management device 604 may include a barcode scanner associated therewith, and mobile management device 604 may be configured to receive input data from the associated barcode scanner. Mobile management device 604 may include a headset associated therewith, such that mobile management device 604 may capture speech of the operator 602. In addition, mobile management device 604 may include one or more buttons, which operator 602 may use to make selections on mobile management device 604.

To load a stored device profile onto a mobile host device by interfacing with the management computer 606 using the mobile host device 604, the operator 602 may verbally speak a command "LIST PROFILES" into a headset associated with the mobile management device 604 (block 608). The mobile management device 604 captures the speech using the associated headset, and generates user input data based at least in part on the captured speech. The mobile management device 604 recognizes the speech and transmits the user input data to the management computer 606 (block 610).

Based at least in part on the received user input data, the management computer 606 executes a stored command function, where the stored command function causes a processor associated with the management computer 606 to determine which device profiles are stored in memory locations associated with the management computer 606 (block 612). In the exemplary routine 600, the management computer determines that device profiles 1.0, 2.0, and 3.0 are stored in memory locations associated with the management computer. Based at least in part on the executed command function, the received user input data, and/or the determined stored device profiles, the management computer generates menu data (block 614). The menu data includes data corresponding to menu selections where the data identifies the stored device profiles. In some embodiments, the menu data may include a menu heading based at least in part on the executed command function.

The menu data is transmitted from the management computer 606 to the mobile management device 604 (block 616), and the mobile management device 604 reproduces an audio menu heading based at least in part on the received menu data (block 618).

In this example, operator 602 requested a listing of the stored client device profiles, and hence, in response the menu heading reproduces "SELECT PROFILE," thereby indicating to operator 602 the beginning of a menu, where the possible menu selections include the stored client device profiles. Using a first button associated with the mobile management device 604, the operator may navigate the menu reproduced based at least in part on the received menu data. As such, operator 602 presses a first button (block 620). In this example, the first button associated with the mobile management device 604 is a button marked with a minus ('−') symbol. In response to the button press, the mobile management device 604 reproduces a first spoken menu selection (block 622). In this example, the menu selections correspond to stored device profiles, and as such, the first spoken menu selection reproduced is spoken as "1.0", the second audio menu selection is spoken as "2.0" and the third audio menu selection is spoken as "3.0." As such, utilizing the first button associated with the mobile management device 604, the operator 602 may navigate the menu selections. In the exemplary routine 600, operator 602 does not want to load device profile 1.0 (block 622), so the operator 602 presses the first button (block 624). In response to the button press, the mobile management device 604 reproduces the second audio menu selection (block 626).

The operator confirms selection of profile 2.0 by pressing a second button associated with the mobile management device 604 (block 628). In the exemplary routine, the second button input is marked with "CONFIRM." While in this exemplary routine, the second input button is denoted with "CONFIRM" the invention is not so limited. A mobile management device may include buttons denoted with a variety of characters, which may be assigned a variety of functions. For example, a button marked with a particular symbol may be assigned any input value, including for example confirm, enter, select, scroll up, scroll down, and/or other such input values where the firmware, operating system, and/or applications executing on the mobile management device may be configured to receive such button input. In response to the operator pressing the second button to confirm, a processor associated with the mobile management device 604 may execute to store a same profile 2.0 as the selected profile in a memory associated with the mobile management device 604, and the mobile management device 604 may generate confirmation audio, such as a "BEEP", to confirm the stored selection by the operator 602 (block 632). Based at least in part on the received menu data and/or the user input data, the mobile management device reproduces an audio request (block 634), thereby requesting the operator 602 to identify one or more mobile host devices to load the selected profile to.

In exemplary routine 600, operator 602 inputs a device identification number '00100' associated with the mobile host device operator 602 desires to load device profile 2.0 to (block 636). In the exemplary embodiment, a barcode scanner is used to capture the device identification number '00100' to mobile management device 604. In response to receiving the device identifier from the barcode scanner, the mobile management device 604 outputs audio confirmation (i.e., "BEEP") (block 638). As shown in FIG. 11, the operator inputs a second device identifier '00102' using the associated barcode scanner (block 640). In response to receiving the device identifier from the barcode scanner, the mobile management device 604 outputs audio confirmation (i.e., "BEEP") (block 642). In this example, the operator 602 desires to manage the two devices already input, as such, the operator may input data indicating to the mobile management device that the input of device identifiers is finished. As such, the operator 402 presses the second button associated with a "CONFIRM" value (block 644). In response to the "CONFIRM" keypress, the mobile management device 604 generates user input data based at least in part on the captured barcodes and the selected profile and transmits the user input data to the management computer 606 (block 646).

Based at least in part on the received user input data, the management computer 606 executes a stored command function, such that device identification numbers '00100' and '00102' are stored in a working set, where the working set is stored in a data structure of a memory associated with the management computer 606 (block 648). In response to execution of the command function, management computer 606 generates confirmation data, where the confirmation data may indicate success or failure of adding the device identification numbers to the working set and may also be based at least in part on the received user input data and/or the executed command function (block 650). The management computer transmits the confirmation data to the mobile management device (block 652), and the mobile management device 604 reproduces audio confirmation for the operator 602 based at least in part on the received confirmation data (block 654), where the audio confirmation notifies the operator 602 that device identifiers '00100' and '00102' have been successfully added to the working list by the management computer 606. Moreover, in some embodiments the mobile management device 604 may reproduce speech for the operator 602 based at least in part on the received confirmation data and/or the stored selected device profile. In this example, the mobile management device 604 reproduces speech to query the operator 602 as to whether profile 2.0 should be loaded to the devices having the associated device identifiers '00100' and '00102' (block 656). The mobile management device 604 waits for the operator 602 to respond. The operator 602 confirms the operation by verbal speech input "YES" which is captured by the headset associated with the mobile management device 604 (block 658), and subject to speech recognition as appropriate.

Based at least in part on the captured speech and/or the stored selected device profile, the mobile management device 604 generates user input data, and the mobile management device 604 transmits the user input data to the management computer 606 (block 660). The management computer 606 executes a stored command function based at least in part on the received user input data, such that device identifiers '00100' and '00102' are retrieved from the working set stored in a data structure associated with the management computer 606, and such that device profile 2.0 is retrieved from a data structure associated with the management computer 606. The management computer 606 transmits device profile 2.0 to the mobile host devices associated with the device identifier '00100' and '00102'.

As such, in exemplary routine 600, the operator 602 may interface with the management computer 606 using the mobile management device 604, to manage the mobile host devices having the device identifier '00100' and '00102'.

While exemplary embodiments of the invention have been described with respect to FIGS. 9-11, those skilled in the art will recognize that the operations illustrated in blocks of the exemplary routines may be removed, added to, and/or performed in alternative sequences without departing from the scope of the invention. For example, Table 1 provides additional commands. Moreover, while some operations performed by mobile management devices, the mobile host devices, and management computers consistent with embodiments of the invention have been described in detail, additional features not recited are contemplated. For example, a management computer consistent with embodiments of the invention may be configured to monitor all mobile devices connected to a communication network, and an operator of a mobile management device may be able to remotely interface with the management computer to receive an audio list of device identifiers associated with all mobile devices connected to the communication network.

Furthermore, while some command functions stored in a memory associated with a management computer and executable by a processor associated with the management computer have been described in detail, additional command functions and/or functions of command functions are contemplated. For example, scanning a barcode associated with a mobile host device using a barcode scanner associated with the mobile management device may select the mobile host device as a subject of the current and/or next operation. Additionally, an operator of a mobile management device may verbally speak "DESCRIBE" followed by a modifier, where the management computer may provide data to the mobile management device such that information related to the modifier may be reproduced for the operator. An operator of a mobile management device may verbally speak "LIST" followed by a modifier, such that the management computer may provide data to the mobile management device such that information related to the modifier may be reproduced for the operator (e.g., "LIST PROFILES" may result in an reproduction of all device profiles stored in memory associated with the management computer; "LIST TASKS" may result in reproduction of task instructions associated with one or more mobile devices; "LIST VOICES" may result in reproduction of voices and/or languages available for use by mobile devices of the system).

In some embodiments, an operator may verbally speak "SELECT" following reproduction of a list, where the management computer may execute a stored command function in response to the verbal input. In some embodiments, an operator may verbally speak "LOAD OPERATOR" where the operator may provide one or more unique identification data, such that a mobile device may be associated with an operator identified by the unique identification data. As such, in these embodiments, an operator may be identified as a supervisor, and the mobile device used by the supervisor may be configured as a mobile management device; likewise, an operator may be identified as a worker, and the mobile device used by the worker may be configured as a mobile host device.

Consistent with embodiments of the invention, an operator may verbally input "LOAD TASK" and the mobile device may interface with the management computer to retrieve a task list associated with the operator and/or mobile device. Additional command functions executable may include, for example: "START LOGGING" where the mobile device used by the operator may begin logging verbal inputs of the operator and/or other data events and transmitting the logged verbal inputs and/or data to the management computer for storage in a memory associated with the management computer; "STOP LOGGING" where the mobile device used by the operator may stop logging verbal inputs of the operator and may also signal to the management computer that no further verbal inputs will be transmitted to the management computer; and/or "CHANGE LOGGING LEVEL" followed by a modifier, where the modifier may indicate a level of logging detail (e.g., time, date, location information, etc.).

In addition, while reproduction has been described in detail as related to audio reproduction using a speaker associated with the mobile management device, the present invention is not limited to audio reproduction. As such, in some embodiments, the management computer may provide data to the mobile management device such that a screen or other indication device associated with the mobile management device may display information, i.e., the data received from the management computer may be reproduced on a screen or other indication device associated with the mobile management device.

Moreover, while many operations have been described as being in response to or based at least in part on various inputs, outputs, executed command functions, etc., in some embodiments of the invention, operations may be based at least in part on various configurations of the system, including for example, the management interface executing on the management computer, the communication protocol of the communication network, the hardware components configured on the mobile management devices, mobile host devices, and/or management computers. Many systems consistent with embodiments of the invention may execute various different types of management interfaces, and as such, operations performed and generated data may vary based on the type of management interface executing on the management computer. As such, embodiments of the invention are not limited to function with only one type of management interface, and may very well interface concurrently with one or more management interfaces of the same or different types within the same system.

The routines executed to implement the embodiments of the invention, whether implemented as part of an operating system or a specific application, component, program, object, module or sequence of instructions executed by one or more computing systems will be referred to herein as a "sequence of operations," a "program product," or, more simply, "program code." The program code typically comprises one or more instructions that are resident at various times in various memory and storage devices in a computing system (e.g., the mobile management device, the management computer, and/or the mobile host devices), and that, when read and executed by one or more processors of the system, cause the system to perform the steps necessary to execute steps, elements, and/or blocks embodying the various aspects of the invention.

While the invention has and hereinafter will be described in the context of fully functioning computing systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical and tangible recordable type media such as volatile and nonvolatile memory devices, floppy and other removable disks, hard disk drives, optical disks (e.g., CD-ROM's, DVD's, etc.), among others.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

In addition, one or more processors of the computing system may execute computer program code in one or more memory and/or storage devices of the computing system, and that the memory may represent the random access memory (RAM) devices comprising the main storage of a computer, as well as any supplemental levels of memory, e.g., cache memories, non-volatile or backup memories (e.g., programmable or flash memories), read-only memories, etc. In addition, a memory may be considered to include memory storage physically located elsewhere in a computer, e.g., any cache memory in a processor, as well as any storage capacity used as a virtual memory, e.g., as stored on a mass storage device or on another interconnected computer.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, a management computer may include more or fewer processors, memory, etc. than those illustrated; moreover, a management computer consistent with the invention may comprise one or more computers communicating over a network.

While embodiments of the invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, embodiments of the invention in broader aspects are therefore not limited to the specific details, representative apparatus and method. Additionally, any of the blocks of the above flowcharts may be deleted, augmented, made to be simultaneous with another, combined, or be otherwise altered in accordance with the principles of the embodiments of the invention. Accordingly, departures may be made from such details without departing from the scope of applicant's general inventive concept.

Other modifications will be apparent to one of ordinary skill in the art. Therefore, the invention lies in the claims hereinafter appended.

What is claimed is:

1. A method of managing mobile devices comprising:
   identifying one or more mobile host devices and creating a working set of the identified mobile host devices;
   communicating user input data from a mobile management device to a management computer over a communication network;
   determining whether communicated user input data includes at least a request for a list of the mobile host devices in the working set, and generating response data based at least in part on the identified mobile host devices in the working set and communicating the response data to the mobile management device;
   determining whether communicated user input data includes a command function for configuring at least one mobile host device in the working set;
   in response to determining that communicated user input data includes a command function, executing the command function at the management computer for at least one mobile host device in the working set; and
   selectively communicating configuration data from the management computer to the at least one mobile host device in the working set over the communication network to configure the mobile host device.

2. The method of claim 1, wherein selectively communicating configuration data includes loading at least one of client device profile data, operator data, task data or voice data on the at least one mobile host device.

3. The method of claim 1 wherein identifying one or more mobile host devices includes obtaining device identification data identifying at least one mobile host device connected to the communication network and
   storing the device identification data in a working set data structure of a memory associated with the management computer to create a working set of identified mobile host devices.

4. The method of claim 2, further comprising storing a plurality of configuration data at the management computer for configuring a mobile host device and determining whether user input data includes a command function to select from the plurality of configuration data, and wherein selectively communicating configuration data includes communicating selected configuration data to the at least one mobile host device.

5. The method of claim 1 further comprising:
   prior to communicating user input data from the mobile management device to the management computer, communicating identification data from the mobile management device to the management computer, the identification data identifying a user of the mobile management device;
   analyzing the identification data to determine whether the user of the mobile management device is authorized to interface with the management computer using the mobile management device;
   communicating user input data from the mobile management device to the management computer over the communication network in response to determining that the user of the mobile management device is authorized to interface with the management computer using the mobile management computer.

6. The method of claim 1, further comprising:
   generating response data based at least in part on the executed command function; and
   communicating the response data to the mobile management device from the management computer over the communication network.

7. The method of claim 6, wherein the response data includes menu data indicating a plurality of menu items the method further comprising reproducing an audio menu at the mobile management device based at least in part on the response data.

8. The method of claim 1, further comprising:
   capturing one or more spoken inputs from a user of the mobile management device using a microphone associated with the mobile management device; and
   generating the user input data based at least in part on the one or more spoken inputs.

9. The method of claim 1, further comprising:
   capturing an input from at least one of a barcode scanner or an RFID reader associated with the mobile management device; and
   identifying one or more mobile host devices based at least in part on the captured input.

10. The method of claim 1, wherein the at least one mobile host device includes the mobile management device.

11. A system for managing mobile devices the system comprising:
    a management computer, at least one mobile management device and a plurality of mobile host devices, the management computer, mobile management device and mobile host devices each including respective processing circuitry and transceiver circuitry for processing data and communicating data between the management computer and the mobile management device and mobile host devices;

the management computer configured to store configuration data for the plurality of mobile host devices;

the mobile management device configured for identifying one or more mobile host devices and for communicating identifying data with the management computer, the management computer configured for creating a working set of identified mobile host devices using the identifying data;

the mobile management device further configured for capturing user input data and communicating the user input data with the management computer;

the management computer configured to determine whether user input data includes at least a request for a list of the mobile host devices in the working set and to generate response data based at least in part on the identified mobile host devices in the working set and communicate the response data to the mobile management device, and further configured to determine whether user input data includes a command function and to execute the command function corresponding to the user input data for at least one mobile host device in the working set in response to determining that the received user input data includes a command function;

the management computer further configured to selectively communicate configuration data with the at least one mobile host device in the working set;

the at least one mobile host device operable for using the configuration data to configure the mobile host device.

12. The system of claim 11, wherein the management computer is configured to selectively communicate configuration data including at least one of client device profile data, operator data, task data or voice data to the at least one mobile host device.

13. The system of claim 11, wherein the mobile management device is further configured to communicate identification data to the management computer prior to communicating the user input data, the identification data identifying a user interfacing with the management computer the management computer configured to analyze the identification data to determine whether the user is authorized to interface with the management computer and the mobile management device communicating the user input data in response to determining that the user interfacing with the management computer is authorized to interface with the management computer.

14. The system of claim 11, wherein the management computer is further configured to generate response data in response to executing the command function based at least in part on the executed command function, and to communicate the response data to the mobile management device.

15. The system of claim 14, wherein the response data includes menu data the mobile management device further configured to receive response data and reproduce an audio menu for a user of the mobile management device based at least in part on the response data.

16. The system of claim 11, wherein the mobile management device is further configured to capture one or more spoken inputs from a user using a microphone associated with the mobile management device and to generate the user input data using the captured one or more spoken inputs.

17. The system of claim 11 wherein the mobile management device is further configured to capture an input from at least one of a barcode scanner or an RFID reader associated with the mobile management device to identify one or more mobile host devices based at least in part on the captured input.

18. The system of claim 11 wherein the management computer is configured to store a plurality of configuration data for configuring a mobile host device, the management computer configured to determine whether user input data includes a command function to select from the plurality of configuration data and further configured to communicate selected configuration data with the at least one mobile host device.

* * * * *